United States Patent Office 3,517,076
Patented June 23, 1970

3,517,076
THERMAL HYDRODEALKYLATION OF ALKYL AROMATIC HYDROCARBONS
William G. Juhl, Seabrook, Tex., and Walter R. Knox and Russell E. Koons, St. Louis, and Frederick E. Rosenberger, Des Peres, Mo., assignors to Monsanto Company, St. Louis, Mo., a corporation of Delaware
No Drawing. Filed Feb. 14, 1966, Ser. No. 527,049
Int. Cl. C07c *3/08, 7/00, 15/00*
U.S. Cl. 260—672                                 6 Claims

ABSTRACT OF THE DISCLOSURE

A process for the concurrent hydrodealkylation of a mixture of alkyl naphthalene hydrocarbons and toluene comprising introducing said mixture in vapor phase concurrently with hydrogen and a non-aromatic ring substituted aromatic hydrocarbon selected from the group consisting of tetralin, alkyl-substituted tetralins, indan, alkyl-substituted indans, indene, alkyl-substituted indenes and mixtures thereof, into a reaction zone in the absence of a catalyst and under conditions which result in substantial backmixing within the reaction zone, the temperature within the reaction zone being 1100 to 1500° F. and the pressure 350 to 1000 p.s.i.g. An effluent is withdrawn from the reactor containing naphthalene hydrocarbons of lower molecular weight than those in the feed and benzene.

---

The present invention relates to the dealkylation of alkyl-substituted compounds. More particularly, the present invention relates to a non-catalytic thermal dealkylation process whereby alkyl-substituted benzenes and alkyl-substituted fused-ring aromatics may be concurrently dealkylated.

The dealkylation of alkyl-substituted aromatic compounds, particularly alkylbenzenes and alkylnaphthalenes, has become within recent years one of the more important hydrocarbon conversion processes. Dealkylation may be carried out either catalytically or non-catalytically. Due to advancements in the art, non-catalytic thermal dealklylation is becoming favored over catalytic processes since the results obtained are not significantly different and the capital expenditure for catalyst and catalyst treating equipment is eliminated. However, despite the advancements in the art of thermally dealkylating alkyl-substituted aromatic compounds, several major problems and deficiencies remain.

The reaction involved in the dealkylation of alkyl-substituted aromatic compounds is highly exothermic. Once initiated, the reaction temperature, which in thermal dealkylation is higher than in catalytic dealkylation, increases rapidly such that cracking and other side reactions may occur producing undesired products, coke and carbon, etc. Thus, it is necessary to install elaborate heat exchange equipment within the thermal reactors or to use other means for controlling the temperature within the reaction zone to avoid the high temperatures at which the undesired side reactions occur. Such temperature control means significantly increase the cost of construction and operation of a thermal non-catalytic dealkylation process.

Another deficiency of the prior art relating to dealkylation in general and particularly to thermal dealkylation, is the lack of processes whereby alkyl-substituted benzenes and alkyl-substituted fused ring compounds, i.e., naphthalenes, phenanthrenes, anthracenes, etc., may be concurrently dealkylated. The majority of the presently known dealkylation processes, both catalytic and thermal, are directed to either, but not both, the dealkylation of alkyl-substituted benzenes or alkyl-substituted naphthalenes. Since both benzene and naphthalene are in great demand, it is quite desirable to have a process where they may be simultaneously obtained by the concurrent dealkylation of alkylbenzenes and alkylnaphthalenes in a single process.

The demethanization of methyl-substituted aromatic compounds has also been a problem in thermal dealkylation. While it is not too difficult to cleave long chain alkyl substitutents to produce shorter chain alkyl substituents, as the alkyl side chain becomes shorter, the difficulty of cleaving it from the aromatic nucleus increases, i.e., reaction rate decreases or becomes slower. The removal of methyl groups as substitutents is particularly difficult. Conditions necessary to removing the methyl group are also conducive to rupture of the aromatic nucleus and thus, destruction of the aromatic compounds as such. While processes have been found whereby the methyl groups can be successfully cleaved from the aromatic nucleus under practical circumstances, still there is room for improvement.

Closely associated with the problem of demethanization, is the problem of increasing the conversion rate of the alkyl-substituted aromatic compounds to the more desired-alkyl-substituted aromatic compounds of lower molecular weight. While some prior art processes have obtained adequate conversion rates, still higher conversion rates are desired to make thermal dealkylation processes more attractive from an economic standpoint.

It is now an object of the present invention to provide a new and novel dealkllation process. An additional object of the present invention is to provide a new and novel non-catalytic thermal process for the dealkylation of alkyl-substituted aromatic compounds. It is a further object of the present invention to provide a non-catalytic thermal process for the concurrent dealkylation of alkyl-substituted benzenes and alkyl-substituted aromatic fused ring compounds. Yet another object of the present invention is to provide a dealkylation process whereby short chain alkyl substituents such as methyl, ethyl or propyl groups, on an aromatic nucelus, may be cleaved from the aromatic nucleus. Another object of the present invention is to provide a non-catalytic thermal process whereby methyl-substituted alkyl aromatic compounds may be dealkylated. A remaining object of the present invention is to provide a non-catalytic thermal dealkylation process in which the exothermic dealklylation may be more effectively controlled. It is also an object of the present invention to provide a non-catalytic thermal dealkylation process whereby improved conversion rates of alkyl-substituted aromatic hydrocarbons to lower molecular weight aromatic hydrocarbons are obtained. Additional objects will become apparent from the following description of the invention herein disclosed.

The present invention which fulfills these and other objects, is a process for the concurrent dealkylation of alkyl-substituted benzenes and alkyl-substituted fused-ring polynuclear aromatic hydrocarbons which comprises introducing a vaporized feed mixture of alkyl-substituted benzenes and alkyl-substituted fused-ring polynuclear aromatic hydrocarbons concurrently with hydrogen in a ratio of 4 to 30 moles of hydrogen per mole of feed mixture and with 0.5 to 25.0% by weight of a non-aromatic-ring-substituted aromatic hydrocarbon selected from the group consisting of tetralin, alkyl-substituted tetralins, indan, alkyl-substituted indans, indene, alkyl-substituted indenes, and mixtures thereof, into a reaction zone in the absence of a catalyst and under conditions such that substantial backmixing occurs within said reaction zone, the temperatures within said reaction zone being within the range of 1100 to 1500° F. and the pressure within the reaction zone being within the range of from about 350 to 1000 p.s.i.g., and withdrawing an effluent containing mono-nuclear and di-nuclear aromatic hydrocarbons of lower molecular weight than those within said feed mixture.

The present invention as defined above represents a substantial improvement in the art of dealkylating alkyl substituted aromatic compounds. Particularly, the present invention provides for concurrent dealkylation of alkyl-substituted benzenes and alkyl-substituted fused-ring aromatics with good yields. However, the present invention may also be very effectively operated with either alkyl-substituted benzenes or alkyl-substituted fused-ring aromatics individually rather than in combination. In addition, the present invention provides for an increase in conversion rate of alkyl-substituted aromatics to aromatics of lower molecular weight. Further, methyl substituents to aromatic hydrocarbons are readily removed by the present process. Another important advantage of the present process is that a more even temperature is obtained in the reactors and the temperature within the reaction zone is more readily controlled despite the exothermic dealkylation reaction. The need for a long series of reactors with an elaborate quench means between reactors or extensive heat exchange means within the reaction zone is reduced. Further, the heat input to the reactors is reduced by the present invention.

In order to demonstrate as well as further describe the present invention, the following examples are presented These examples are not to be construed as limiting the present invention.

EXAMPLE I

To illustrate the present invention, a mixture comprising alkyl aromatic hydrocarbons and non-aromatic ring-substituted aromatic hydrocarbons was subjected to hydrodealkylation conditions in accordance with the present invention in a reaction system involving three cylindrical reactors in series connected so as to provide for downflow through the first reactor, upflow through the second reactor and downflow in the third reactor, thereby providing for continuous flow between the first and second reactor and the second and third reactor. The composition of the mixture of alkyl aromatic hydrocarbons and non-aromatic ring-substituted aromatic hydrocarbons was as shown in Table I:

TABLE I

| Component: | Wt. percent |
|---|---|
| Toluene | 58.6 |
| Methylnaphthalene | 10.1 |
| Dimethyl naphthalene | 5.0 |
| Ethyl naphthalene | 2.1 |
| $C_3$ alkyl naphthalenes | 0.8 |
| Tetralins | 2.5 |
| Indan | 0.3 |
| Methyl indans | 4.0 |
| Unidentified | 16.6 |

This mixture of alkyl aromatic hydrocarbons and non-aromatic ring-substituted aromatic hydrocarbons was introduced concurrently with hydrogen in a mole ratio of hydrogen to hydrocarbon of 7.5:1 into a vaporizer and then a preheater which brought the temperature of the hydrocarbon-hydrogen mixture up to approximately 1250° F. at which temperature the mixture was introduced into the top of the first reactor. The reaction mixture was passed through the three reactors and an effluent recovered from the bottom of the third reactor. Conditions within the three reactors and the results obtained from the hydrodealkylation are presented in the following table.

TABLE II

| Conditions | 1st reactor | 2nd reactor | 3rd reactor |
|---|---|---|---|
| Temperature, °F | 1,310 | 1,325 | 1,325 |
| Pressure, p.s.i.g | 550 | 550 | 550 |
| Residence time, sec | 3 | 3 | 6 |

Results:
- Percent conversion of alkylnaphalenes ........ 85
- Percent conversion of toluene ............... 70

The use of three empty reactors under the above conditions in the reactors resulted in substantial backmixing. As a result, temperatures with each reactor were relatively uniform from top to bottom, varying only approximately 2 to 5° F. in first reactor and 1 to 2° F. in second and third reactors. Also, as a result of the backmixing effect, less heat input is necessary than where backmixing does not occur.

EXAMPLE II

In further demonstration of the present invention and to particularly illustrate the improved results which may be obtained from the concurrent dealkylation of alkylbenzenes and alkylnaphthalenes and from carrying out hydrodealkylation in the presence of non-aromatic ring-substituted aromatic hydrocarbons, a series of hydrodealkylation runs were carried out. All of the runs were carried out under thermal hydrodealkylation conditions using only a single reactor. The conditions of operation in all of the runs were substantially similar except that at least two runs were made with several of the feeds with temperature being varied between the two runs. Toluene was used in all of the runs as the alkylbenzene. The conversion rate of toluene to benzene from each run was reduced to a $k$ factor [1] in order to take into consideration slight variations in hydrogen partial pressure and residence time. Table III below presents the conditions used for the series of runs and Table IV presents the $k$ factor resulting from hydrodealkylation of toluene alone and in the presence of methylnaphthalene and various non-aromatic ring-substituted aromatic hydrocarbons at the two temperature levels. All percents expressed are as percents of total feed.

TABLE III

| | Run 1 | Run 2 |
|---|---|---|
| Temperature, °F | 1,250 | 1,275 |
| Pressure, p.s.i.g | 650 | 650 |
| Residence time, sec | 6 | 6 |
| Hydrogen to hydrocarbon mole ratio | 8/1 | 8/1 |

TABLE IV

| | $k$ factor [1] | |
|---|---|---|
| Component | 1,250° F. | 1,275° F. |
| Toluene alone | .884 | 1.446 |
| Toluene and 30% 2-methylnaphthalene | 1.232 | 2.114 |
| Toluene and 30% 1-methylnaphthalene | 1.513 | 2.196 |
| Toluene and 20% tetralin | 2.076 | 3.785 |
| Toluene and 6.1% Indan mixture [2] | 1.791 | |
| Toluene and 9.1% Indene-Indan mixture [3] | 1.317 | |

[1] The $k$ factor is obtained by the following formula $$K = 100 \cdot \frac{1}{y[H_2]^{1/2}} \log \cdot \frac{100}{100-x}$$

wherein $x$ is the percent conversion of toluene, $y$ is the residence time in seconds and $[H_2]$ is the hydrogen concentration in atmospheres.

[2] The indan mixture was approximately 3.80 wt. percent indan, 84.6 wt. percent methyl indans and 11.6 wt. percent $C_2$ indans.

[3] The indene-indan mixture was approximately 0.98 wt. percent indan, 20.10 wt. percent methyl indans, 8.37 wt. percent $C_2$ indans, 0.50 wt. percent $C_3$ indans, 3.03 wt. percent indene, 65.30 wt. percent methyl indenes and 1.50 wt. percent $C_2$ indenes.

The results shown in Table IV above demonstrate the substantially improved results which may be obtained in accordance with the present invention. Results of substantially similar magnitude are obtained when alkyl naphthalenes and mixtures of alkylbenzenes and alkyl-substituted fused-ring compounds are hydrodealkylated in the presence of the non-aromatic ring-substituted aromatic hydrocarbons.

The alkyl-substituted aromatic feedstocks to the process of the present invention include both broad natural hydrocarbon fractions derived from petroleum or coal which contain both alkyl-substituted benzenes and alkyl substituted fused-ring aromatics and synthetic mixtures of alkyl-substituted benzenes and alkyl-substituted fused-ring aromatic hydrocarbons. The term "fused-ring aromatic hydrocarbons", as used herein refers to polycyclic aromatic hydrocarbons in which two aromatic rings share two carbon atoms. Included within this definition are such polycyclic aromatics as naphthalene, phenanthrene, anthracene, chrysene, etc. In most instances, it is less economically attractive or desirable to use broad natural hydrocarbon fractions containing both alkyl-substituted benzenes and alkyl-substituted fused-ring aromatic hydrocarbons. Such broad fractions usually include materials which decompose in the reaction zone to form carbon and other undesirable products. Further, such broad fractions include many materials which do not contribute to the dealkylation reaction and thus these materials become mere "dead weight" on the process. Usually, it is more desirable to use a synthetic mixture of alkyl-substituted benzenes and alkyl-substituted fused-ring aromatics. Such synthetic mixtures may be comprised of relatively pure alkylbenzenes in admixture with relatively pure alkyl-substituted fused-ring aromatics or may be comprised of mixtures of fractions containing these materials along with other close boiling compounds. In carrying out the process of the present invention in its most advantageous mode of practice, the aromatic feed usually will contain no less than 10 or more than 95% by weight of alkylbenzenes with the amount of alkyl-substituted fused-ring aromatics present being sufficient to cause a weight ratio of alkyl-substituted benzenes to alkyl-substituted fused-ring aromatics of 0.1:1 to 95:1. In a particularly useful mode of practicing the present invention, the aromatic feed will contain 40 to 95% by weight of alkyl-substituted benzenes with the amount of alkyl-substituted fused-ring aromatics being such as to cause a weight ratio of alkyl-substituted benzenes to alkyl-substituted fused-ring aromatics of 1:1 to 25:1. While as indicated above and particularly as demonstrated by the above examples, the present invention is most useful when applied to a mixture of alkylbenzenes and alkyl-substituted fused-ring aromatics, the invention is not so limited. The present process is quite useful when applied to alkylbenzenes alone or when applied to alkyl-substituted fused-ring aromatics alone.

The alkyl-substituted benzenes which may be readily processed in accordance with the process of the present invention include those containing from 7 to 12 carbon atoms and higher. Non-limiting examples of such alkylbenzenes are toluene, dimethylbenzenes, trimethylbenzenes, ethylbenzene, methylethylbenzene, diethylbenzenes, triethylbenzenes, propylbenzene, methylpropylbenzenes, dimethylpropylbenzenes, ethylpropylbenzenes, dipropylbenzenes, butylbenzenes, methylbutylbenzenes, dimethylbutylbenzenes, ethylbutylbenzenes and the like. The present invention is, however, most useful when the alkyl-substituted benzenes are those containing 7 to 9 carbon atoms. Such alkyl-substituted benzenes include toluene, dimethylbenzenes, trimethylbenzenes, methylethylbenzenes, propylbenzene and isopropylbenzene. The alkyl-substituted fused-ring aromatics include alkylnaphthalenes, alkylphenanthrenes, alkylanthracenes, alkylpyrenes and alkylchrysenes. The alkyl substituents of these aromatic hydrocarbons include those containing 1 to 5 carbon atoms and higher. Also, the alkyl-substituted fused-ring aromatics may be mono- or polyalkyl substituted. The present invention is most useful in the dealkylation of the alkylnaphthalenes, particularly the methyl and dimethylnaphthalenes.

Non-aromatic ring-substituted aromatic hydrocarbons which are introduced concurrently with the alkyl-substituted aromatic hydrocarbon feed in accordance with the present invention include tetralin, alkyl tetralins, indan, indene, alkyl indenes, alkyl indans, and mixtures thereof. The amount of such aromatic hydrocarbons introduced into the reaction zone generally is 0.5 to 25% by weight of the total hydrocarbon feed. Introduction of these materials concurrently with the alkyl aromatic feed material results in an increased conversion rate of the alkyl-substituted aromatic hydrocarbons to lower molecular weight aromatic hydrocarbons as demonstrated in the examples above. In the preferred practice of the present invention, the amount of non-aromatic ring-substituted aromatic hydrocarbons introduced concurrently with the alkyl-substituted aromatic feed is 5 to 20% by weight of the total hydrocarbon feed to the reaction zone. Tetralin is the particularly preferred non-aromatic ring-substituted aromatic hydrocarbon for inclusion in the process of the present invention.

In carrying out the process of the present invention, it is generally preferred to exclude or substantially reduce acenaphthene from the feed material. When present in significant quantities, this material results in a substantial reduction in the conversion of alkyl-substituted aromatic hydrocarbons to lower molecular weight aromatic hydrocarbons. Hydrodealkylation of toluene in the presence of 20% by weight acenaphthene as described in Example II above has been found to result in a $k$ factor of 0.6816 at 1250° F. and 1.200 at 1275° F., both $k$ factors being below that of toluene alone. Usually, feeds to the hydrodealkylation process of the present invention should contain less than 2% by weight acenaphthene, preferably less than 1%.

In carrying out the process of the present invention, the temperatures within the reaction zone are most often maintained within the range of from about 1100 to about 1500° F. At temperatures below the lower temperatures, the desired dealkylation reactions fall to a rate too low for practical utility. When the temperature is increased above the higher temperature of 1500° F., the aromatic nucleus of the various alkyl aromatics will begin to rupture, causing loss of aromatic product and the formation of excessive amounts of carbon. Preferred temperatures for the reaction zone in the operation of the present process are within the range of from about 1175° to about 1400° F.

The pressures at which the thermal dealkylation reaction is maintained are somewhat critical to the present process. Usually, the pressure will be within the range of 300 to 1000 p.s.i.g. Pressures below 300 p.s.i.g. result in a rapid decrease in both rates of conversion and in benzene yields from the concurrent dealkylation of alkyl-substituted benzenes and alkyl-substituted fused-ring aromatic hydrocarbons, while pressures above the 1000 p.s.i.g. limit may be used but are less desired because of the increased expense of such pressures. In practicing the present invention in accordance with a particularly preferred embodiment thereof, pressures within the reaction zone are maintained within the range of from about 350 to 800 p.s.i.g.

In practicing the present invention, it is necessary that external hydrogen be added to the reaction zone concurrently with the alkyl-substituted aromatic feedstock. This hydrogen is most often added in a mole ratio of hydrogen to alkyl-substituted aromatic feedstock of from about 4:1 to 30:1. Preferably, hydrogen to alkyl-substituted aromatic feedstock mole ratios of from 5:1 to 15:1 are used in the practice of the present invention. Optimum ratios of hydrogen to feed are, of course, dependent on the other conditions of the process, the amount of partially dealkylatable material in the feedstock and the partial pressure of the hydrogen in the system.

The residence time of the reactants within the dealkylation zone in accordance with the process of the present invention is usually within the range of 2 to 50 seconds. However, residence times of 5 to 15 seconds have been found to be more useful.

In carrying out the process of the present invention, the reactants are introduced into the reaction zone under conditions such that substantial backmixing occurs. The term "backmixing", as used herein, refers to the circulation within the reaction chamber of the reactants and product as opposed to a straight-through flow of reactants through the reaction chamber. Backmixing may be induced in a reaction chamber by any number of means well known to those skilled in the art. Among such means are the use of nozzles to introduce the reactants into the reaction chamber, the use of baffles or other deflecting means within the reaction chamber to deflect the incoming reactants into a circular flow path. Further, the reactor may be so designed as to promote backmixing. Also, control of space velocity within the reaction chamber along with sizing and positioning of inflow and outflow means of the reactor provide additional means of inducing backmixing. With backmixing, the exothermically produced heat is circulated through the reaction zone which results in a more even distribution of heat throughout the reaction zone and also allows for heat produced by the exothermic hydrodealkylation to be directly utilized to further heat incoming reactants. The use of backmixing in the reaction zone alleviates much of the need for using a series of reactors with a quench means between each reaction as a means of controlling the temperature.

The feed material to the reactors is generally in the vapor state on introduction to the reactors. Usually, vapor temperatures will vary depending on the components in the feed material, but are most often at or near the dealkylation temperature.

What is claimed is:

1. A process for the concurrent hydrodealkylation of a mixture of alkyl naphthalene hydrocarbons and toluene in which the toluene represents 10 to 95 percent by weight of said mixture, which comprises vaporizing such mixture and introducing said mixture concurrently with hydrogen in a ratio of 4 to 30 moles of hydrogen per mole of hydrocarbon and with 0.5 to 25.0 percent by weight of a non-aromatic ring substituted aromatic hydrocarbon, based on the total amount of toluene and alkyl naphthalenes in said mixture, said non-aromatic ring substituted hydrocarbon being selected from the group consisting of tetralin, alkyl substituted tetralins, indan, alkyl substituted indans, indene, alkyl substituted indenes and mixtures thereof, into a reaction zone in the absence of a catalyst and under conditions such that substantial backmixing occurs within said reaction zone, the temperatures within said reaction zone being within the range of 1100 to 1500° F. and the pressures within said reaction zone being within the range of 350 to 1000 p.s.i.g., withdrawing an effluent containing naphthalene hydrocarbons of lower molecular weight than those introduced into said reaction zone and benzene.

2. The process of claim 1 wherein the non-aromatic ring substituted aromatic hydrocarbon is a mixture of at least two of the non-aromatic ring substituted aromatic hydrocarbons selected from the group consisting of tetralin, alkyl-substituted tetralin, indan, alkyl-substituted indans, indene and alkyl-substituted indenes.

3. The process of claim 1 wherein the temperature within the reaction zone is 1175 to 1400° F.

4. The process of claim 1 wherein the pressure within the reaction zone is 300 to 800 p.s.i.g.

5. The process of claim 1 wherein a residence time of the reactants within the reaction zone is within the range of 2 to 50 seconds.

6. The process of claim 1 wherein there is less than 2% by weight of acenaphthene present in the reaction zone.

References Cited

UNITED STATES PATENTS

| 2,929,775 | 3/1960  | Aristoff et al. | 208—133 |
|-----------|---------|-----------------|---------|
| 3,145,238 | 8/1964  | Kestner         | 260—672 |
| 3,150,196 | 9/1964  | Mason           | 260—672 |
| 3,193,595 | 7/1965  | Kenton et al.   | 260—672 |
| 3,198,846 | 8/1965  | Kelso           | 260—672 |
| 3,198,847 | 8/1965  | Lanning         | 260—672 |
| 3,201,488 | 8/1965  | Sherk et al.    | 260—672 |
| 3,256,357 | 6/1966  | Baumann et al.  | 260—672 |
| 3,284,527 | 11/1966 | Gill et al.     | 260—672 |
| 3,288,873 | 11/1966 | Moll            | 260—672 |
| 3,288,875 | 11/1966 | Payne et al.    | 260—672 |
| 3,296,323 | 1/1967  | Myers et al.    | 260—672 |
| 3,160,671 | 12/1964 | Feigelman et al.| 260—672 |
| 3,223,745 | 12/1965 | Davidson        | 260—672 |
| 2,674,635 | 4/1954  | Beckberger.     |         |
| 3,055,956 | 9/1962  | Paulsen         | 260—672 |
| 3,210,434 | 10/1965 | Chapman         | 260—670 |
| 3,213,153 | 10/1965 | Mills           | 260—672 |

FOREIGN PATENTS

| 685,079   | 12/1952 | Great Britain. |
| 1,004,475 | 9/1965  | Great Britain. |

OTHER REFERENCES

Fowle & Pitts: "Thermal Hydrodealkylation," Chem. Eng. Progress 58(4) 37–40 (1962).

Feigelman & O'Connor: "HDA Process," Hydroc. Processing 45(5) 139–44 (1966).

Feigelman et al., "Thermally Dealkylate Toluene," Hydrocarbon Processing 44(12) 147–150 (December 1965).

DELBERT E. GANTZ, Primary Examiner

G. E. SCHMITKONS, Assistant Examiner

U.S. Cl. X.R.

260—668, 674